May 18, 1965 E. K. BUYZE ETAL 3,183,999
SPLIT HOUSING SPOT TYPE DISK BRAKE
Filed Dec. 28, 1962 3 Sheets-Sheet 1
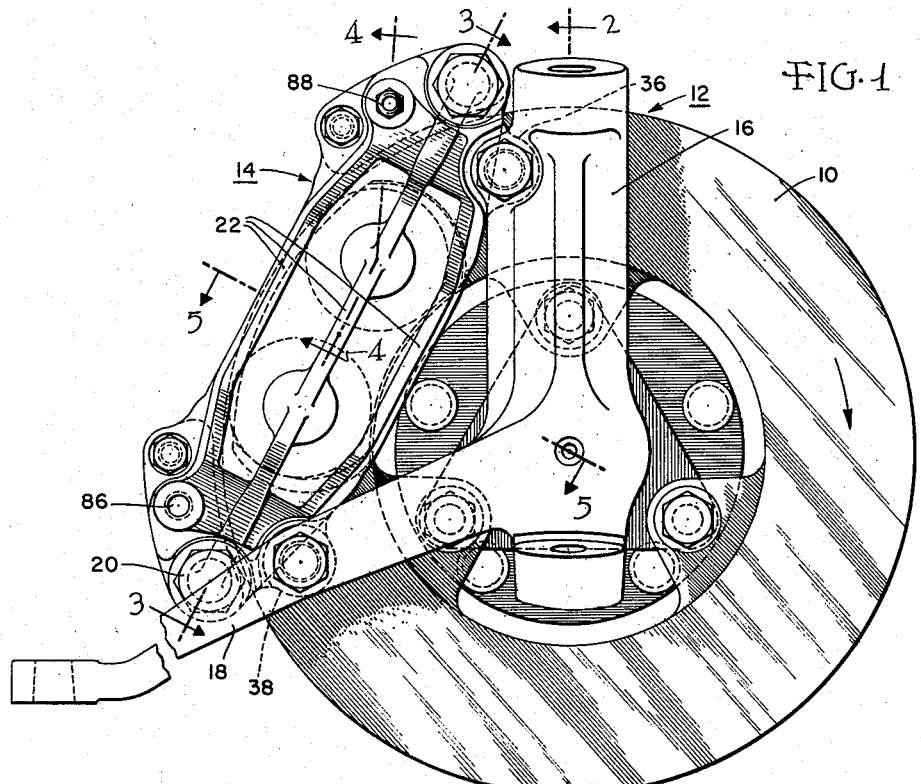
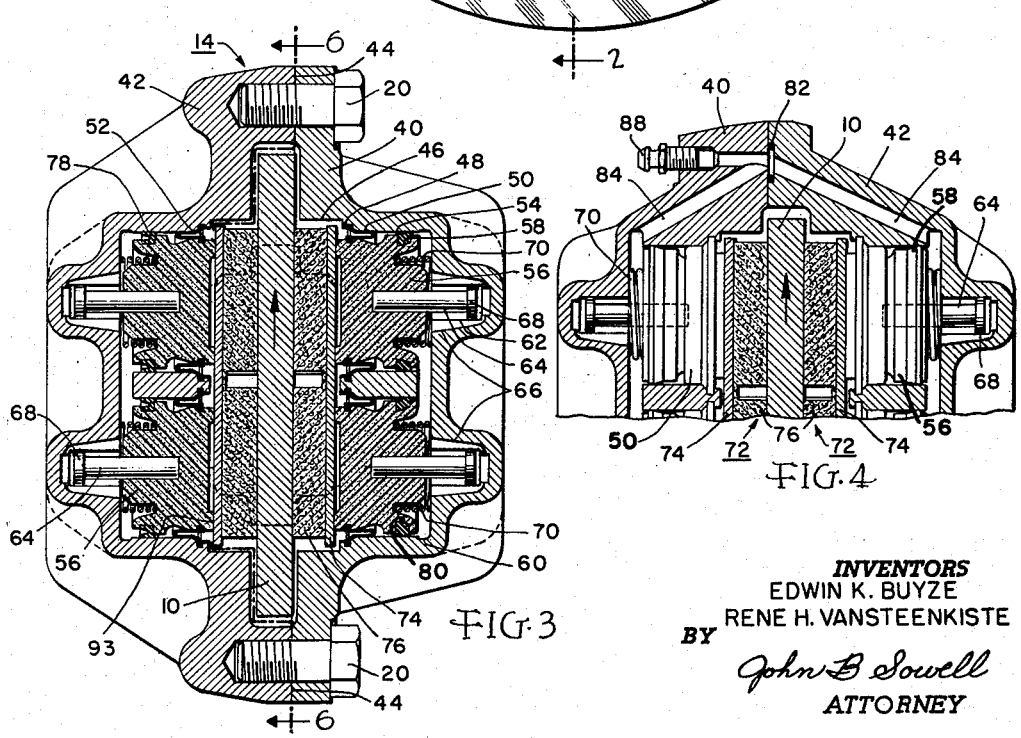
INVENTORS
EDWIN K. BUYZE
RENE H. VANSTEENKISTE
BY
John B Sowell
ATTORNEY May 18, 1965  E. K. BUYZE ETAL  3,183,999
SPLIT HOUSING SPOT TYPE DISK BRAKE
Filed Dec. 28, 1962  3 Sheets-Sheet 2

INVENTORS
EDWIN K. BUYZE
RENE H. VANSTEENKISTE
BY
John B. Sowell
ATTORNEY

May 18, 1965 E. K. BUYZE ETAL 3,183,999
SPLIT HOUSING SPOT TYPE DISK BRAKE
Filed Dec. 28, 1962 3 Sheets-Sheet 3
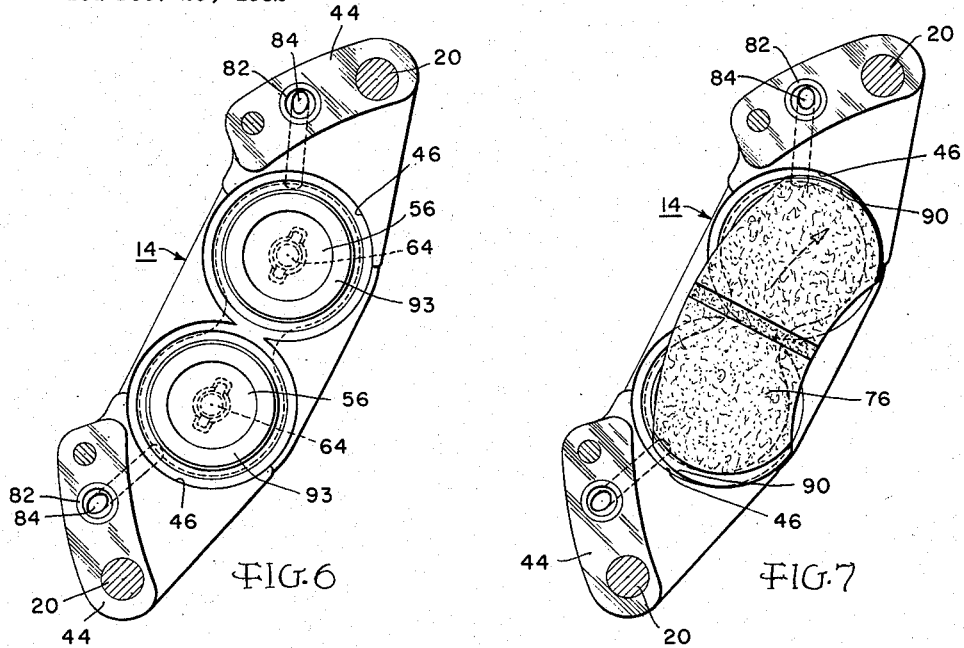
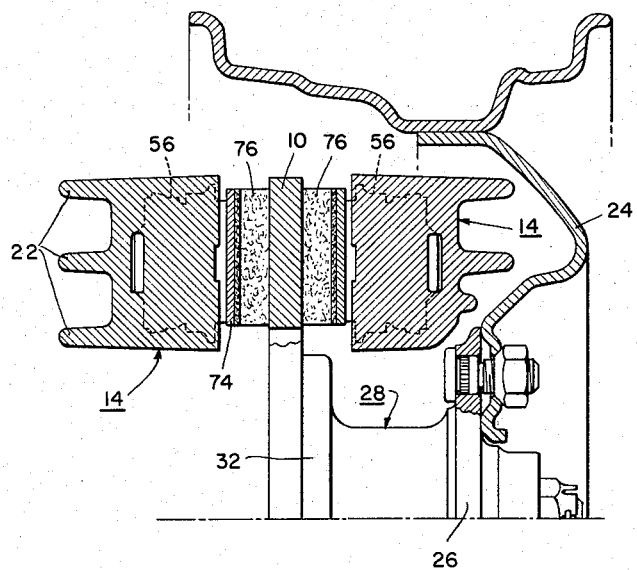
INVENTORS
EDWIN K. BUYZE
RENE H. VANSTEENKISTE
BY
John B Sowell
ATTORNEY United States Patent Office 3,183,999
Patented May 18, 1965

3,183,999
SPLIT HOUSING SPOT TYPE DISK BRAKE
Edwin K. Buyze, St. Clair Shores, and Rene H. Vansteenkiste, Grosse Pointe Woods, Mich., assignors to The Budd Company, Philadelphia, Pa., a corporation of Pennsylvania
Filed Dec. 28, 1962, Ser. No. 248,004
11 Claims. (Cl. 188—18)

This invention relates to brakes for motor vehicles and more particularly to split housing disk brakes.

Heavy disk brakes are well known and have been employed almost one hundred years in the railway industry. However, light weight disk brakes have only recently been employed on automobiles to achieve higher performance braking especially on sports cars and racing cars. The disk of a disk brake heats under frictional engagement with the liners and cools while out of engagement with the liners. Differential temperatures in the disk, combined with bending moment braking forses, cause the light weight disk to warp or bend out of a true plane creating a flutter or vibration during braking. Brake disks coacting with friction pads tend to exert lateral forces on the brake shoes, housings, actuating pistons and piston seals which cause local wear and leaks.

Automotive disk brakes are attached to spring mounted suspended wheel systems and of necessity must be lightweight, simplified structures unaffected by vibrations imposed due to wheel bounce and braking.

Therefore, it is a primary object of the present invention to provide an improved simplified disk brake structure employing an improved housing, piston and seal structure.

It is another object of the present invention to provide a new and improved axially stabilized piston structure free from vibration and wear.

It is another object of the present invention to provide an improved housing and mounting structure for a split housing type brake.

It is a further object of the present invention to provide an improved housing and mounting structure that is arranged to provide compensating braking forces.

It is another object of the present invention to provide a split housing type brake with loose brake shoes free from vibration and noise.

It is another object of the present invention to provide a new and improved mounting structure for a split housing brake having a vibration free radial plane annular disk.

In accordance with the invention, there is provided in a split housing type disk brake, a split housing open at the sides and closed at the ends to provide a slotted structure fitted over a sector of a wheel disk, dual piston bores in each half of said split housing, dual guide bores in each half of said split housing machined concentric to said piston bores, cylindrical pistons in said piston bores arranged in opposing pairs on either side of said disk, raised annular front faces on said pistons for engagement with an annular segmented brake shoe, circumferential grooves in said pistons having ring seals fitted therein, annular recesses in the rear faces of said pistons having helical springs fitted therein and maintained in compression between said pistons and said housing causing said brake shoes urged by said spring loaded pistons to maintain engagement with said brake disk, and guide pins affixed to and extending from the rear faces of said piston, said guide pins being fitted into said guide bores to provide axial stability to said pistons in said piston bores.

Other features and objects of the invention will be found throughout the more detailed description of the invention which follows. To more clearly portray the invention and its manner of operation the description is supplemented with the accompanying drawings wherein:

FIG. 1 is a side elevation of the novel split housing type disk brake as seen from the center line of the automobile;

FIG. 3 is a section through the split housing in elevation taken at lines 3—3 of FIG. 1;

FIG. 4 is a section through the hydraulic passages of the split housing in elevation taken at lines 4—4 of FIG. 1;

FIG. 5 is a section in plan view taken through the split housing at lines 5—5 of FIG. 1;

FIGS. 6 and 7 are elevation views of the caliper housing taken at lines 6—6 of FIG. 3 showing the relative location of the brake shoe to the split housing;

Figure 2:
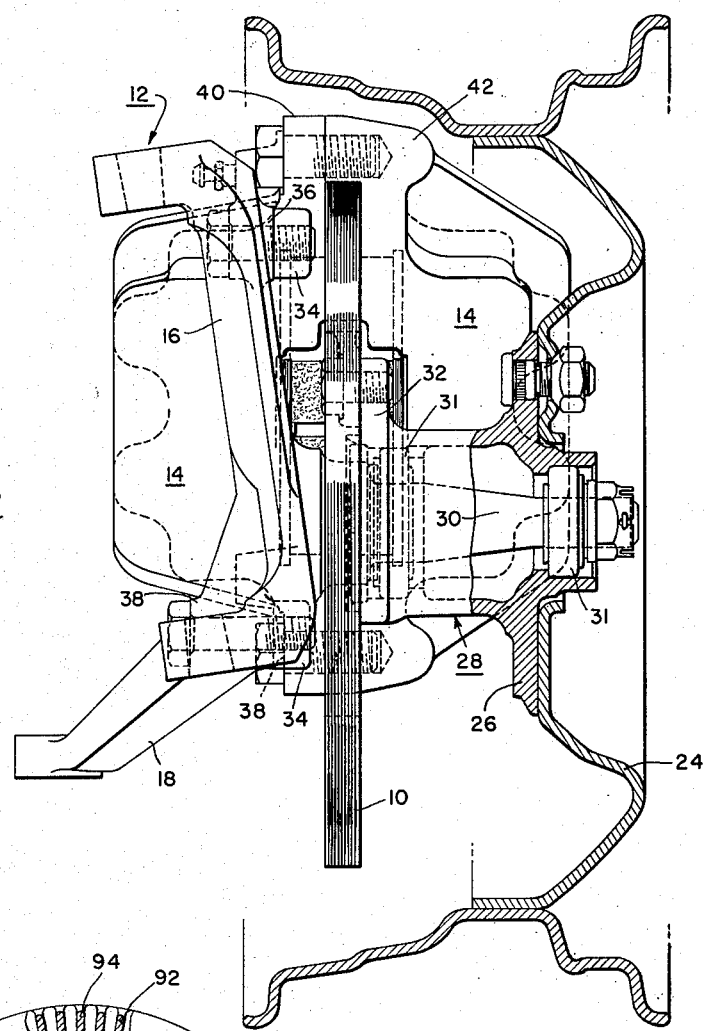
FIG. 2 is an end elevation in partial section taken at lines 2—2 of FIG. 1.

Referring now to FIG. 1 showing a brake disk 10 mounted on a spindle assembly 12 and having a split housing 14 mounted between the vertical spindle support 16 and the steering arm 18 of the spindle assembly. In FIG. 1 the disk 10 rotates clockwise for forward movement of the car and the steering arm extends from the vertical spindle support 16 both rearward and inwardly toward the center line of the vehicle. Thus, it will be noted that the split housing 14 is located in the upper rear quadrant relative to the rotating disk. The split housing differs from the caliper type brake housing in that the caliper housing is substantially C- or U-shape and forces imposed by hydraulic action of the pistons tend to open the U-shape housing, thus misaligning the pistons operating in the housing. In the split housing type brake the pistons are aligned on a center line on which the clamping means 20 at the ends of the housing are substantially aligned; thus the split housing provides an envelope closed at the ends and open on at least one side for cooperation with the disk 10. However, the axial forces of the pistons tending to open the envelope maintain alignment for the forces are acting on a fixed end beam rather than a C shape caliper which is basically a series of cantilever beams. Reinforcing ribs 22 on the outer portions of the housing provide structural rigidity as well as cooling for the housing. These reinforcing ribs act as fixed end beams fixed at the ends of the housing by the clamping means 20.

Referring now to FIGS. 1 and 2 there is shown a wheel 24 mounted on a flange 26 of a hub 28. The hub 28 is rotatably mounted on a wheel spindle 30 of the spindle assembly 12 by conventional roller bearings 31. A disk flange 32 is provided on the hub 28 for mounting the brake disk 10. Brake disk 10 substantially bisects split housing 14. When the brakes are applied the clockwise rotation of brake disc 10 acts to move the housing 14 upward as shown in FIGS. 1 and 2. However, this upward force causes a turning moment which acts downward through hub 28 thus loading the top of the bearings. The weight of the automobile transmitted through the wheel 24 tends to load the bottom of the bearings as shown in FIG. 2 and the inertia forces due to braking of the automobile also tend to load the bottom of the wheel bearings. Placement of the split housing in the upper rear quadrant relative to the brake disc tends to oppose the normal load in the bearings or lift the wheel spindle assembly thus insuring greater life to the wheel bearings and providing greater stability in the disk brakes. The split housing 14 is provided with mounting extensions 34 on one of the pieces of the two piece housing. These mounting extensions are located adjacent the ends of the housing and in a plane substantially in alignment with the plane of the brake disk. These mounting extensions 34 abut similar mounting extensions 36 and 38 provided on the vertical spindle support and the steering arm. As shown in FIG. 2 the mounting brackets of the housing being slightly off center from the radial plane of the brake disk 10 tend to twist the housing in a counter-clockwise direction due to the offset braking forces creating turning moment between the housing and the disk. However, the small turning moment imposed on the housing is transferred directly to the spindle assembly on which the hub and disk are mounted. Therefore, any tendency to twist the housing would also twist the spindle assembly which would rotate the wheel spindle thus re-aligning the rotating hub and disk to the new position of the split housing. It has been found that mounting the split housing between the steering arm and the vertical spindle support creates compensated forces which tend to maintain alignment of the housing with the disk as well as compensating for normal loading of the wheel bearings.

Referring now to FIGS. 3 to 7 showing the two pieces 40 and 42 of the split housing 14 held together at the closed ends 44 by clamping means 20. At least one side of the housing is open to permit insertion of the brake disk 10. However, it has been found that leaving both sides of the housing open lightens the weight of the housing, improves piston alignment and avoids any clogging or accumulation of debris in the housing. Housing pieces 40 and 42 are preferably machined having a series of concentric bores decreasing in diameter. The larger diameter 46 provides a bearing seat for cooperation with the brake shoes. The next smaller diameter provides an attachment groove 48 for a dust boot 50 held by a clip ring 52. The next smaller diameter provides a piston bore 54 for coaction with pistons 56 provided with piston rings or piston seals 58. At the bottom of the piston bore there is provided a slight undercut face 60 to permit free flow of hydraulic fluid completely around and behind the pistons 56. The next smaller diameter provides a guide bore 62 for cooperation with guide pin 64 which is permanently attached into the piston 56 and extending from the rear face of piston 56. The next smaller diameter provides a reservoir behind the guide pin interconnected by key slots 66 in the bore 62. Guide pin 64 preferably has an anti-friction tin plated cylindrical flanged head 68 to insure against entrapment of air when the brakes are being bled or filled for experience has shown small remote cavities become pockets for entrained air. Guide pins 64 provide axial stability to piston 56 and eliminate the tendency to twist in the bore. It was found that this feature eliminates piston vibrations. Coil spring 70 is preferably of large diameter and fitted between the bottom of the piston bore and a recessed annular surface in the rear face of piston 56. A large diameter coil spring is axially stable and tends to align itself concentric with guide bore 62 and guide pin 64; also the spring provides a sufficient compression force over a relatively long movement to eliminate brake shoe vibrations.

Brake shoe 72 consists of a backing plate 74 bonded to a relatively thick friction liner 76. In the preferred embodiment shown, friction liner 76 is in constant engagement with brake disk 10 as a result of the small force applied by coil springs 70. Thus, springs 70 perform an automatic adjustment function maintaining zero space between friction liner 76 and brake disk 10. In order to maintain a very light pressure between the friction liners and the disk a U-shape piston seal 78 may be provided in cylindrical groove 80 of piston 56. When a rectangular solid piston seal 78 is employed it is preferred that the sides of the cylindrical groove 80 be parallel and the bottom of the groove have a slight bevel. When the annular rectangular seal 78 is stretched over the rear face of piston 56 and clamps into the bevelled groove 80 the outer edge of the seal rather than the face touches the piston bore 54. Thus, a solid rectangular annular piston seal may be employed in such a manner that only an edge portion of the outer diameter of the piston seal engages the piston bore thus providing a tight seal having a low frictional force opposing coil spring 70.

A ring hydraulic seal 82 is provided between the mating hydraulic passageways 84 as shown in FIGS. 4, 6 and 7. These passageways interconnect the facing of the housing 14 to the chamber behind the pistons 56 and completely eliminate cross over tubes and external hydraulic lines. A fluid inlet connection 86 is provided at the bottom of the innermost split housing for connection to the master cylinder by well known flexible tube means (not shown) and at the uppermost portion of the inner split housing a bleeder connection 88 is provided.

Replacement of brake shoes 72 requires that the split housing be disconnected from the spindle assembly and disk. When the shoes 72 are in the normal position of the disk they will slide out. The direction of forward rotation of brake disk 10 in FIG. 1 is clockwise. The direction of forward rotation of the wheel disk for FIGS. 3, 4 and 7 is upward as shown by the arrow. Normal engagement of brake shoe 72 with brake disk 10 causes edge portion 90 of the backing plate to engage edge portion 46 of the housing as shown in FIG. 7. Friction line 76 as shown in FIGS. 3, 4 and 7 is not symmetrically centered on the backing plate 74 for in normal use the forward rotation of brake disk 10 causes a slight turning moment between the braking face of the liner 76 and the backing plate 74. This offset shoe shifts the central axis of the friction liner upward as viewed in FIGS. 3, 4 and 7 and provides a means of compensating for uneven brake liner wear. The shifted axis of the liner produces longer life by uniformly distributing the load between brake disk 10 and friction liner 76. The edge contact of the backing plate does not readily transmit heat to the housing. Pistons 56, made of heat insulating material, have raised annular front faces 93 to further eliminate heat transfer.

Figure 8:
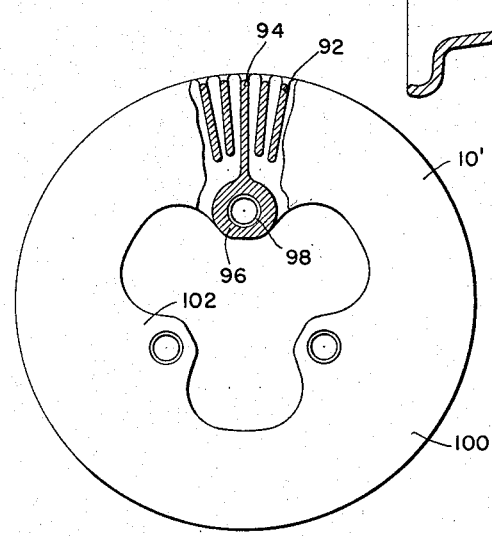
FIG. 8 is a partial section in elevation of a hollow core cast iron disk which may be employed in the present invention as an alternative structure.

FIG. 8 shows a partial section in elevation of a modified form of brake disk having a blade shaped inner core 92 for induced air flow self-cooling. A central internal fin 94 of the novel disk terminates in a solid mounting structure 96 which surrounds the mounting apertures 98. It was discovered that under excessive braking conditions the disk 10' tends to heat and expand radially. When a solid disk is employed this heating is concentrated in the outer annular surface 100 leaving a cooled inner annular surface 102 for mounting purposes. The differences in temperature encountered between these two annular surfaces tend to cause distortion and warpage of the disk 10 or 10'. However, when the mounting structure is provided with the aperture 98 isolated inboard of the outer annular disk portion 100 warpage is eliminated. Aperture 98 is surrounded with sufficient mounting structure to provide torsional stability and is shaped away sharply to connect to the outer annular surface 100. Thus, it can be seen that placement of apertures 98 in the inner anular surface 102 and cooperating with the outer annular surface 100 with a minimum amount of metal interconnection reduces the effect of thermal gradients between the outer and inner annular surfaces 100 and 102. In actual practice it was discovered that the clover leaf configuration shown in FIG. 8 completely eliminated the warpage due to thermal discontinuities in a solid plate brake disk 10 and the addition of the cooling fins 92, 94 substantially increased the cooling effect by inducing air circulation similar to a fan. At high speeds, with repeated braking, the interiorly cooled disk 10' substantially eliminated fading.

The preferred embodiment shown illustrates a structure which does not induce vibrations and the superiority of a split housing type brake mounted between a steering arm and the spindle support employing an annular segmented friction liner cooperating with a brake disk having a clover leaf mounting structure. The novel guide pin and housing arrangement having spring loaded pistons causing constant brake shoe engagement eliminates vibration in th working parts. Having explained the superiority of the principles involved in the novel housing and the arrangement of the housing with the cooperating structure many equivalents will suggest themselves to those skilled in the art. It is accordingly desired that the appended claims be given a broad interpretation commensurate with the scope of the invention in the art.

What is claimed is:

1. A disk brake spindle assembly for the front wheel of an automobile of the type having a pivotable wheel comprising:
   (a) a spindle assembly comprising,
      (1) a pivotable vertical spindle support having a mounting surface on its upper end,
      (2) a horizontal spindle support extending outward from said vertical spindle support for mounting a wheel hub having a rotatable brake disk thereon,
      (3) a steering arm extending longitudinally and inward from said vertical spindle support having a mounting surface on its extended free end,
   (b) a split housing comprising,
      (1) two housing portions connected together at their end portions and encompassing a sector of said brake disk therebetween to form a brake housing,
      (2) piston bores in each said housing portion opposite said sector of said disk and aligned between said end portions,
      (3) an upper and a lower mounting face on said housing located radially outward in the same sector of said brake disk as said piston bores in said housing,
   (c) and fastening means connecting said upper mounting face to said upper end of said vertical spindle support and said lower mounting face to said free end of said steering arm, said housing providing self-aligning torsional restraint of said brake disk on said hub during braking.

2. A disk brake assembly for the front wheels of an automobile comprising:
   (a) a vertical spindle support having an upper free end,
   (b) a horizontal spindle connected to and extending outward from the lower portion of said vertical spindle,
   (c) a steering arm connected to said spindle support and having a free end extending inwardly and laterally away therefrom,
   (d) a rotatable hub mounted on said horizontal spindle,
   (e) a brake disk having annular braking surfaces connected to said rotable hub for movement therewith,
   (f) a brake housing having sides positioned opposite the annular braking surfaces and ends which connect the sides and extend axially across the outer perimeter of said brake disk,
   (g) a first torque taking point provided in the free end of said vertical spindle support,
   (h) a first mounting bracket on one of said closed ends of said housing connected to said first torque taking point,
   (i) a second torque taking point provided in the free end of said steering arm,
   (j) and a second mounting bracket on the other of said closed ends of said housing connected to said second torque taking point,
   (k) said housing forming a rigid structural connection between the free end of said vertical spindle support and said free end of said steering arm which strengthens said assembly and eliminates the need for auxiliary mounting means.

3. A disk brake assembly for the front wheels of an automobile comprising:
   (a) a vertical spindle support having an upper free end,
   (b) a horizontal spindle connected to and extending outward from the lower portion of said vertical spindle,
   (c) a steering arm connected to said spindle support and having a free end extending inwardly and laterally away therefrom,
   (d) a rotable hub mounted on said horizontal spindle,
   (e) a brake disk having annular braking surfaces connected to said rotable hub for movement therewith,
   (f) a brake housing having sides positioned opposite the annular braking surfaces and ends which connect the sides and extend axially across the outer perimeter of said brake disk,
   (g) a first torque taking point provided in the free ends of said vertical spindle support,
   (h) a first mounting bracket on one of said closed ends of said housing connected to said first torque taking point,
   (i) a second torque taking point provided in the free end of said steering arm,
   (j) and a second mounting bracket on the other of said closed ends of said housing connected to said second torque taking point,
   (k) said housing forming a rigid structural connection between the free end of said vertical spindle support and said free end of said steering arm, and said torque taking points in said free ends forming the sole points for the transfer of torque braking forces from said housing.

4. A disk brake for the front wheel of an automobile of the type employing a rotatable disk affixed to a bearing supported hub comprising:
   (a) a vertical spindle support having an upper free end;
   (b) a horizontal spindle connected to and extending outward from the lower portion of said vertical spindle support, said horizontal spindle being adapted to mount said bearing supported hub;
   (c) a steering arm connected to said spindle support and extending inwardly and laterally away therefrom to provide a free end;
   (d) split housing comprising,
      (1) a pair of ends adapted to extend across the rotatable disk at the outer perimeter thereof,
      (2) a pair of laterally spaced sides adapted to straddle a segment of the rotatable disk, said sides being connected to each of said closed ends of said housing;
   (e) a first mounting bracket integral with one of said pair of closed ends of said split housing, said bracket being connected to the upper free end of said vertical spindle support;
   (f) and a second mounting bracket integral with the other closed end of said split housing, said bracket being connected to the free end of said steering arm;
   (g) said split housing forming a structural connection between the free ends of said vertical spindle support and said steering arm providing a rigid structural member therebetween and further providing a housing structure that applies forces through said mounting brackets to said steering arm and vertical spindle support which oppose the normal forces acting between the horizontal spindle and the bearing supported hub.

5. A heat isolation split housing of the type having two limbs which straddle opposite sides of a rotatable brake disk comprising:
   (a) two elongated housing bodies axially spaced apart from a segment of said brake disk, (b) stop shoulder portions connected to the ends of said elongated housing bodies and axially spaced apart from said brake disk, (c) portions connected to said stop shoulder portions, two of said end portions being connected together and extended axially across said brake disk to form two closed ends on said split housing, (d) at least one cylindrical piston bore in each elongated housing body spaced between the stop shoulders on the ends of the housing bodies, (e) a friction liner isolated from engagement with said housing spaced opposite said brake disk, (f) a backing plate connected to said friction liner intermediate said cylindrical piston bore and said friction liner, (g) edges on said backing plate extending circumferentially beyond said cylindrical piston bore and said friction liner providing isolation of said friction liner from said housing, said edges of said backing plate further providing the sole points of engagement with said stop shoulder of said housing, (h) a composite piston comprising an insulating material front portion engaging said backing plate and separated and isolated from engagement with said housing and said bore, a rear guide portion connected to said front portion and isolated from normal engagement with said bore by a piston seal, and a metallic guide pin extending rearwardly therefrom slidably guided in said housing and engageable with said housing at a point remote from said bore.

6. A heat isolation split housing according to claim 5 wherein there is further provided an annular guide ring on said rear guide portion of said composite piston of greater diameter than the remainder of said composite piston and of smaller diameter than said piston bore, a groove in said rear guide portion adjacent said annular guide ring, and a piston seal fitted in face to face contact with the bottom and the side of said groove adjacent said annular guide ring, said piston seal having a raised lip thereon of larger diameter than said annular ring for centering said composite piston in said piston bore and providing heat isolation from normal engagement between said piston bore and said composite piston.

7. A heat isolation split housing according to claim 6 wherein said groove in said rear piston adjacent said annular guide ring is provided with a beveled groove bottom surface rising from front to rear, the higher point of said bevel being radially opposite said raised lip of said piston seal.

8. In a split housing type disk brake according to claim 6 in which said guide pin further includes a cylindrical flanged head on said guide pin for frictional engagement with said guide bore.

9. A heat isolation split housing of the type having two limbs which straddle opposite sides of a rotatable brake disk comprising:

(a) two elongated housing bodies axially spaced apart from a segment of said brake disk, (b) stop shoulder portions connected to the ends of said elongated housing bodies and axially spaced apart from said brake disk, (c) end portions connected to said stop shoulder portions, two of said end portions being connected together and extended axially across said brake disk to form two closed ends on said split housing, (d) at least one cylindrical piston bore in each elongated housing body spaced between the stop shoulders on the ends of the housing bodies, (e) a friction liner isolated from engagement with said housing spaced opposite said brake disk, (f) a backing plate connected to said friction liner intermediate said cylindrical piston bore and said friction liner, (g) edges on said backing plate extending circumferentially beyond said cylindrical piston bore and said friction liner providing isolation of said friction liner from said housing, said edges of said backing plate further providing the sole points of engagement with said stop shoulder of said housing, (h) a front piston portion of insulation material engaged with said backing plate and isolated by an air gap from engagement with said housing, (i) a rear piston portion connected to said front piston portion to form an integral unit therewith, said rear piston portion being isolated from engagement with said bore and having a metallic guide pin of smaller diameter than said front piston portion extending rearwardly therefrom, (j) and a blind guide pin bore in said housing extending rearwardly from said piston bore for slidably engaging said guide pin and providing an axial guide for said integral piston unit.

10. A heat isolation split housing according to claim 9 wherein said guide pin bore is cylindrical in shape and has tapered slots extending outward from the cylindrical sides, said tapered slots extending from said piston bore to the bottom of said guide pin bore providing an auxiliary fluid passage to the bottom of said guide pin bore.

11. In a split housing type disk brake according to claim 9 in which said piston further includes a cylindrical groove, said groove having parallel side portions and a bevelled bottom portion for receiving a rectangular shaped annular seal ring which is deformed by said bottom portion of said cylindrical groove to form a parallelogram shape seal ring having edges slidably engaging said piston bores for forming hydraulically sealed compartments between the rear face of said pistons and said bores of said housing.

References Cited by the Examiner

UNITED STATES PATENTS

| Re. 24,996 | 6/61 | Butler | 188—73 |
|---|---|---|---|
| 1,820,878 | 8/31 | Wyckoff | 92—248 X |
| 1,904,070 | 4/33 | Morgan | 92—248 X |
| 2,380,085 | 7/45 | Tack et al. | 188—218 |
| 2,435,814 | 2/48 | Allison | 280—96.1 |
| 2,456,793 | 12/48 | Reed et al. | 280—96.1 |
| 2,655,230 | 10/53 | Buyze | 188—152.873 X |
| 2,753,959 | 7/56 | Johnson | 188—218 |
| 2,801,714 | 8/57 | Dotto | 188—152 |
| 2,915,147 | 12/59 | Davis | 188—73 |
| 2,981,376 | 4/61 | Zeidler | 188—73 |
| 3,051,272 | 8/62 | Burnett | 188—106 X |
| 3,118,682 | 1/64 | Fredd | 277—170 |

FOREIGN PATENTS

| 1,090,611 | 10/54 | France. |
|---|---|---|
| 1,204,493 | 8/59 | France. |
| 1,281,582 | 12/61 | France. |
| 1,196,309 | 5/59 | France. |

ARTHUR L. LA POINT, *Primary Examiner.*

EUGENE G. BOTZ, *Examiner.*